United States Patent
Mathe et al.

[11] Patent Number: 6,042,190
[45] Date of Patent: Mar. 28, 2000

[54] VEHICLE SEAT

[75] Inventors: Willi Mathe, Sindelfingen; Rolf Mitschelen, Kirchheim; Martin Steiner, Grafenau, all of Germany

[73] Assignee: DaimlerChrysler AG, Stuttgart, Germany

[21] Appl. No.: 09/157,410

[22] Filed: Sep. 21, 1998

[30] Foreign Application Priority Data

Sep. 19, 1997 [DE] Germany ............................ 197 41 371
Jun. 25, 1998 [DE] Germany ............................ 198 28 255

[51] Int. Cl.⁷ ............................ A62B 35/00; A62B 35/04
[52] U.S. Cl. ........................ 297/483; 297/486; 297/468; 297/470; 297/216.1; 297/216.13; 297/216.15; 297/216.19; 297/216.2; 280/808
[58] Field of Search ....................... 297/483, 484, 297/486, 468, 470, 216.1, 216.13, 216.15, 216.19, 216.2, 238; 280/808

[56] References Cited

U.S. PATENT DOCUMENTS

| | | | |
|---|---|---|---|
| 3,367,715 | 2/1968 | Curran | 297/484 |
| 3,832,002 | 8/1974 | Eggert, Jr. et al. | 297/470 X |
| 4,289,352 | 9/1981 | Ashworth | 297/783 X |
| 4,531,762 | 7/1985 | Sasaki et al. | 280/808 X |
| 4,541,654 | 9/1985 | Jonasson | 297/238 X |
| 4,629,214 | 12/1986 | Fohl | 280/808 |
| 4,667,982 | 5/1987 | Volk et al. | 297/483 X |
| 5,123,673 | 6/1992 | Tame | 297/484 X |
| 5,131,683 | 7/1992 | Johnson | 297/484 X |
| 5,411,319 | 5/1995 | Kuiri | 297/483 |
| 5,472,234 | 12/1995 | Chang | 297/483 X |
| 5,524,928 | 6/1996 | Monagas | 297/484 |
| 5,570,933 | 11/1996 | Rouhana et al. | 297/483 |

FOREIGN PATENT DOCUMENTS

| | | |
|---|---|---|
| 37 41 831 | 6/1989 | Germany . |
| 6-255445 | 9/1994 | Japan . |
| 1150085 | 4/1969 | United Kingdom . |

*Primary Examiner*—Peter M. Cuomo
*Assistant Examiner*—Rodney B. White
*Attorney, Agent, or Firm*—Evenson, McKeown, Edwards & Lenahan, PLLC

[57] ABSTRACT

A vehicle seat with a seat cushion, adjustably fixed to the floor of the vehicle, and a backrest, which can be adjusted with respect to the seat cushion, is provided with a restraining device for the seat user. The restraint comprises a three-point safety belt and an additional belt. For optimum protection of the seat user in the resting position and also to prevent so-called submarining, a fixed adjustment of seat cushion and backrest is provided in the resting position in such a manner that the backrest is swiveled about an obtuse angle with respect to the seat cushion, and the seat cushion is shifted into a predetermined front position in the driving direction and inclined towards the rear. The additional belt extends as a transverse shoulder belt from the upper edge of the backrest to a belt buckle disposed near the floor.

20 Claims, 2 Drawing Sheets

VEHICLE SEAT

BACKGROUND AND STORY OF THE INVENTION

This application claims the priority of German Patent Application Nos. 197 41 371.4 and 198 28 255.9, filed Sep. 19, 1997 and Jun. 25, 1998, respectively, the disclosures of which are expressly incorporated by reference herein.

The invention relates to a vehicle seat with a seat cushion, adjustably fixed to the floor of a vehicle, and a backrest, which can be adjusted with respect to the seat cushion, as well as with a restraining device for the seat user.

In the case of a known vehicle seat of this type, for example from German Patent document DE 37 41 831 C2, a belt guide for the three-point safety belt, in which the shoulder belt can be suspended when the safety belt is pulled out and buckled into the belt buckle, is disposed on the side of the seat facing the side wall of the vehicle at the upper edge of the backrest. An additional belt is fastened with one of its ends at the shoulder belt in that section of the belt webbing between the first belt fixing point disposed at the side wall of the vehicle and the belt guide on the backrest and supplied at its other end with a buckle tab. The tab can be inserted into the second belt buckle, which is fastened on the side of the seat averted from the side wall of the vehicle to the side surface of the backrest. With this, the restraining device forms a four-point safety belt in the resting position with the second belt buckle as the fourth fastening point.

In the resting position of the seat user, this known four-point safety belt reliably prevents, in the case of a crash, a dynamic raising of the upper part of the body of the belted seat user; however, it cannot effectively prevent a so-called submarining, during which the seat user slides under the belt around the hip or the pelvis. Moreover, the additional belt, which hangs down loosely at the side wall of the vehicle from the shoulder belt when the seat user is in the seated position and must be fastened in some manner with its buckle tab to the side wall of the vehicle, in order to avoid rattling noises, is bothersome.

In the case of a vehicle seat, which is also known, for example from Japanese patent document JP 6-255 445 A and its abstract, the restraining device for the seat user has a three-point safety belt and an additional belt, which extends counter to the chest or shoulder belt of the three-point safety belt from the upper edge of the backrest, over the chest of the seat user, to the second belt buckle. Both belts are intended to be used in the normal seated position of the seat user, that is, with the backrest in an upright position or in a position slightly inclined to the rear. In addition to being fastened above the upper edge of the backrest at the side wall of the vehicle, the three-point safety belt is passed through a reversing fitting at the upper edge of the backrest, as a result of which the backrest cannot be swiveled completely into the resting position when the seat user is buckled up.

It is an object of the invention to optimally support the user of the above-mentioned type of vehicle seat in the resting position, even against the so-called submarining effect, without thereby causing negative repercussions on the design and use of the three-point safety belt in the seated position.

Pursuant to the invention, this and other objects are achieved by providing a vehicle seat with a seat cushion, adjustably fixed to the floor of a vehicle, and a backrest, which can be adjusted with respect to the seat cushion, as well as with a restraining device for the seat user. The restraining device has a three-point safety belt with a chest or shoulder belt extending in the seated position of the seat user over the chest of the latter, from a first belt fixing point, which is disposed above the upper edge of the backrest at a side wall of the vehicle, to a detachable belt buckle forming a second belt fixing point and fastened in the floor area on the side of the seat opposite the wall of the vehicle and with a hip or pelvis belt extending over the pelvis of the seat user from the belt buckle to a third belt fixing point, which is disposed in the floor area on the side of the seat facing the side wall of the vehicle. An additional belt, which can be utilized in a swiveled position of the backrest that is intended as a resting position for the seat user can be tightened over the chest of the seat user to a second belt buckle. In the resting position of the seat user, on the one hand, a fixed adjustment of the seat cushion and of the backrest is provided, so that the backrest can be swiveled through an obtuse angle relative to the seat cushion and the seat cushion is shifted into a front, predetermined position and inclined towards the rear and, on the other, the additional belt extends as a transverse shoulder belt from the upper edge of the backrest to the second belt buckle, which is disposed close to the floor.

The vehicle seat according to the present invention has the advantage that, by the fixed, defined adjustment of the seat cushion and the backrest in the resting position and the therewith associated downward slope of the seat cushion rearward, which can be brought about by raising the front edge of the seat cushion and/or lowering the rear edge of the seat cushion, a submarining of the user is reliably prevented, since the seat user, fastened to the seat cushion by the tightened belt around the pelvis, is supported with the buttocks in the driving direction at the adjusted seat cushion. In the event of a crash, the tendency of the upper part of the body of the seat user to be raised up, which is initiated by this fastening of the pelvis, is counteracted by the additional belt, which passes the forces into the frame of the backrest. The frame of the backrest, which advantageously is reinforced, acts here like a force limiter, which dissipates energy, in the further course, energy also being consumed in the seat frame or seat underframe of the seat cushion consisting of the seat frame and seat pad. Consequently, the raising of the passenger takes place relatively slowly overall, so that the seat user reaches the shoulder belt of the three-point safety belt with a relatively low residual velocity and residual energy. Upon reaching the shoulder belt, the effect of the three-point safety belt and, optionally, that of the passenger air bag, set in, and the seat user behaves approximately like a seat user who is in the normal, seated position before the crash. Accordingly, the stress values on the seat user are slight even in the resting position. The additional belt can also be additionally equipped with conventional safety technology, such as a belt tightener, in order to prevent slackness in the belt when the additional belt and the force limiter are put on.

In the case of the inventive vehicle seat, the three-point safety belt remains unchanged and retains its normal configuration and use function. If the additional belt, pursuant to a preferred embodiment of the invention, is fastened to the upper edge of the backrest by means of a belt retractor, the additional belt in the seated position is always in the retracted state and does not interfere in any way with the handling of the three-point safety belt when the latter is put on, or with the aesthetics of the buckled-up safety belt in the seated position or with the aesthetics of the vehicle seat in the retracted position of the three-point safety belt.

Advantageous embodiments of the inventive vehicle seat with appropriate further developments and refinements of the invention are described herein.

Pursuant to a preferred embodiment of the invention, the additional belt and the three-point safety belt are coupled together automatically in such a manner, that the additional belt cannot be pulled out of the belt retractor, as long as the belt lock of the three-point safety belt is not closed. This prevents the additional belt, properly intended for the resting position, from being put on in the seated position and ensures that the three-point safety belt is also put on in the resting position.

Other objects, advantages and novel features of the present invention will become apparent from the following detailed description of the invention when considered in conjunction with the accompanying drawings.

DETAILED DESCRIPTION OF THE DRAWINGS

Figure 1:
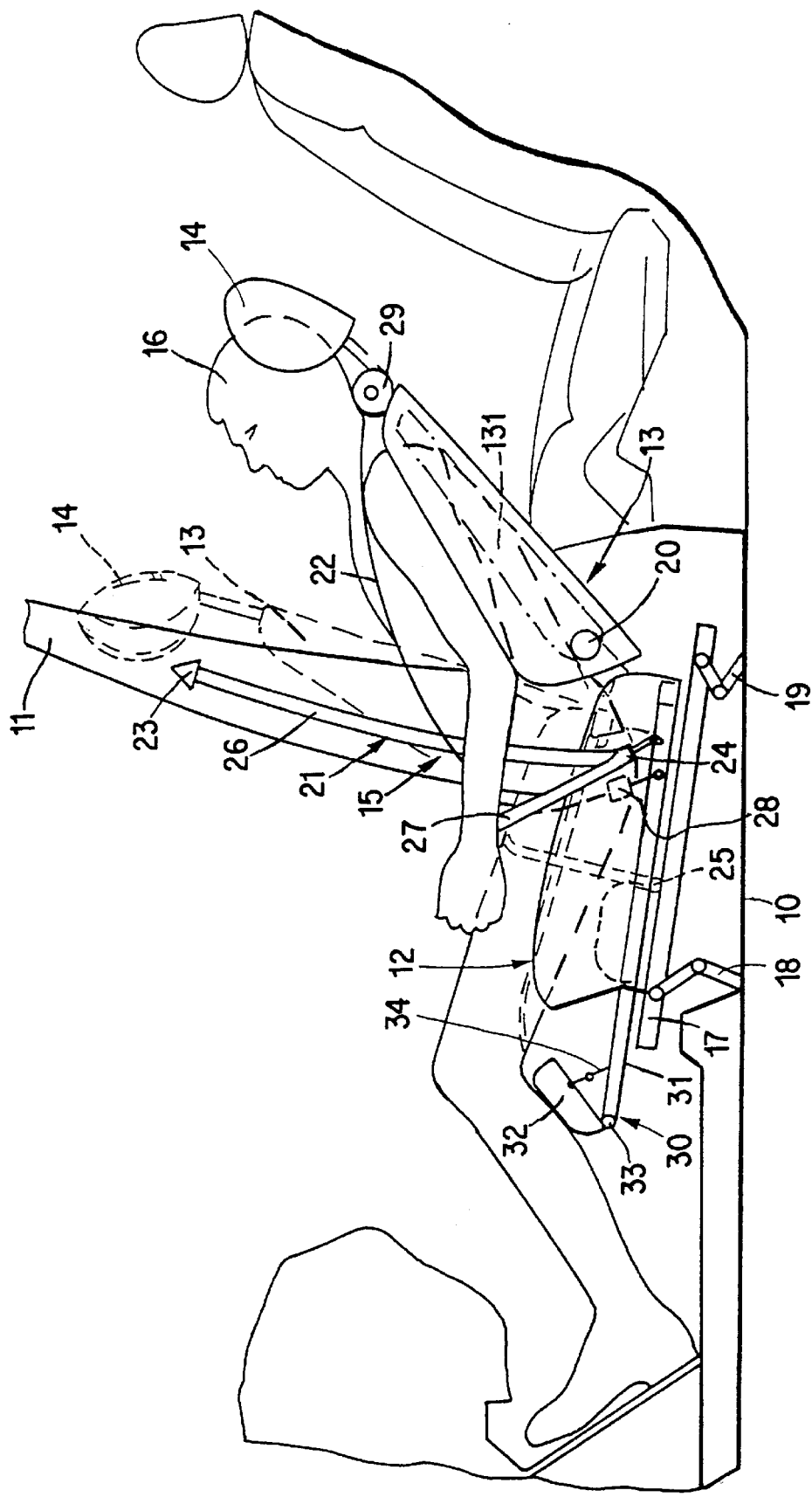
FIG. 1 is a side view of a vehicle seat, on which a seat user is belted, in a diagrammatic representation.

In FIG. 1, the floor of a passenger car is labeled 10 and a central or B column, which represents a part of the side wall of a vehicle, is labeled 11. The vehicle seat, accommodated in the passenger car, has a seat cushion 12, fastened to the floor 10 of the vehicle and a backrest 13 with head support 14, adjustable with respect to the seat cushion 12, as well as a restraining device 15 for fastening a seat user 16 to the seat cushion 12 and the backrest 13 in the event of a crash.

The seat cushion 12, usually consisting of a seat frame or seat underframe and of the seat pad accommodated thereby, can be shifted in the longitudinal direction of the vehicle and held at the floor 10 of the vehicle so that its inclination to the floor 10 of the vehicle can be adjusted. For this purpose, on the one hand, guide rails 17, extending in the longitudinal direction of the vehicle and, on the other, height adjusting means are provided, which are shown in the example as toggle levers 18, 19, the toggle lever 18 engaging close to the front end of the seat cushion and the toggle lever 19 close to the rear end of the seat cushion. The backrest 13 is held pivotably at the lateral joint fittings 20, which are connected firmly with the seat cushion 12, and can be adjusted and swiveled at will with respect to the surface of the seat cushion 12. All adjustments of the seat components are made by electric servomotors which, for the sake of greater clarity, are not shown here.

In the drawing, a so-called resting position of the vehicle seat is shown, in which the seat user 16 can assume a more prone position for relaxation during the trip. A fixed adjustment of seat cushion 12 and backrest 13 is assigned to this resting position, so that the backrest 13 can be swiveled through an obtuse angle with respect to the seat cushion 12 and the seat cushion 12 is inclined towards the rear in the driving direction. The latter takes place by lifting the seat cushion 12 all the way to the top at the front or lowering the seat cushion completely to the bottom at the back. At the same time, the seat cushion 12 is shifted in a defined longitudinal adjustment along the guide rails 17. This adjustment of the seat components in the resting position is stored in a memory and can be recalled at any time, this adjustment being brought about automatically by energizing the servomotors. The resting position adjustment can be energized by a manually operated function key, which is not shown here. In the case of vehicle seats, which already have a so-called seat memory, this resting position of the seat can be retained in the seat memory.

The restraining device 15 of the vehicle seat has a three-point safety belt 21 and an additional belt 22, which is to be used only in the resting position. The function of the three-point safety belt 21 is to fasten the seat user 16 in a known manner to the seat of the vehicle in a seated position, in which the backrest 13 is in the upright position, as shown by the broken line in the drawing. By means of a reversing fitting 23, disposed at the B column 11 above the upper edge of the backrest 13, a belt buckle 24, which is fastened in the floor region to the side of the seat opposite the B column, here at the underframe of the seat, and into which the buckle tab, which can be moved on the webbing, can be inserted in a known manner, and a fastening 25 for the webbing end, provided in the region of the floor at the side of the seat facing the B column 11, the three-point safety belt 21 is divided into a chest or shoulder belt 26, which extends from the reversing fitting 23 over the chest of the seat user 16 to the belt buckle 24, and into a hip or pelvis belt 27, which extends from the belt buckle 24 over the pelvis and the thigh region of the seat user 16 up to the fastening 25. In the usual manner, the other end of the belt is taken up in a belt retractor, which is disposed at the foot of the B column 11 and from which the webbing is passed over the reversing fitting 23. For the sake of greater clarity, the belt retractor is not shown.

Aside from the three-point safety belt 21, the additional belt 22 is used to secure the seat user 16 in the resting position. It is fastened with its one end to the side of the seat opposite or away from the B column 11 on the upper edge of the backrest 13 and with its other end can be inserted by means of a buckle tab in a second belt buckle 28, which is fastened on the side of the seat, facing the B column 13, in the floor region, preferably at the seat underframe of the seat cushion 12. The additional belt 22 is fastened to the backrest by means of a belt retractor 29, which is fastened to the reinforced frame 131 of the backrest 13.

If the seat user 16, fastened to the vehicle seat with the three-point safety belt 21, is swiveled by actuating the "Resting Position" key from its normal sitting position with the backrest 13 upright (shown in the drawing by the broken line) into the resting position, the shoulder belt 26 of the three-point safety belt 21, as is evident from the drawing, is lifted from the chest region of the seat user 16. The seat user 16 now takes hold of the buckle tab, protruding from the belt retractor 29, at the additional belt 22 and pulls this over his shoulder and his chest as far as the side of the seat facing the B column 11 and here locks the buckle tab in the second belt buckle 28. If there is now a frontal collision, the seat user 16 is prevented by the slope of the seat cushion 12, set for the resting position, and by the tightened pelvis belt 27 of the three-point safety belt 21 from sliding under the three-point safety belt 21. By means of this fixing of the pelvis, the upper body of the seat user 16 increasingly tends to attain an upright position. The reinforced frame 131 of the backrest 13 acts here like a force limiter, that is, the seat user 16 sits up somewhat in the vehicle seat; at the same time, however, energy is absorbed by the frame 131 of the backrest and furthermore by the seat underframe of the seat cushion 12. As a result, the sitting up of the seat user 16 takes place relatively slowly, so that the seat user reaches the shoulder belt 26 of the three-point safety belt 21 with relatively less residual velocity and residual energy. A collision of the upper body with the tightened shoulder belt 26 is thus prevented by the additional belt 22. When the shoulder belt 26 is reached, the effect of the three-point safety belt and, optionally, of the front seat passenger airbag sets in and the seat user 16 reacts approximately like a seat user, who is in the normal seated position before the crash.

In order to prevent that the additional belt 22 is put on deliberately or accidentally in the normal, seated position of the vehicle seat instead of the prescribed three-point safety belt 21, an automatic coupling is provided between the three-point safety belt 21 and the additional belt 22 in such a manner, that the additional belt is basically blocked from being pulled out of the belt retractor 29 and that this blockage is removed only when the tab of the buckle of the three-point safety belt 21 is locked into the first belt buckle 24.

In the second belt buckle 28, additionally a microswitch may be provided, which is activated by insertion of the buckle tab and brings about the recall of the resting position adjustment from the memory. In this case, it is possible to do without a separate key for manually triggering the seat component setting for the resting position.

To improve the seated comfort in the resting position of the vehicle seat, a lower leg support 30 is also disposed in the seat cushion 12. When the seat components are adjusted to the normal, seated position, the lower leg support 30 lies within the seat cushion contour, from which it can be shifted automatically in the resting position into its lower leg support position by means of an electric servomotor. As indicated diagrammatically in the drawing, the lower leg support 30 has a support 31, which can be shifted longitudinally in guides in the seat cushion 12, and a padded support 32, which is pivotably disposed on the front end of the support 31. When the support 31 reaches its maximum extended position, the padded support 32 swivels about upward about a fulcrum 33 into a set position optimum for supporting the lower leg. In this position, the padded support 32 is held by appropriate kinematics, which are realized in the drawing as a lever linkage 34. The lower leg support 30 is shown in the use position in the drawing. When not in use, the lower leg support 30 is in the position indicated by the padded support 32, shown by the broken lines, within the seat cushion contour.

Figure 2:
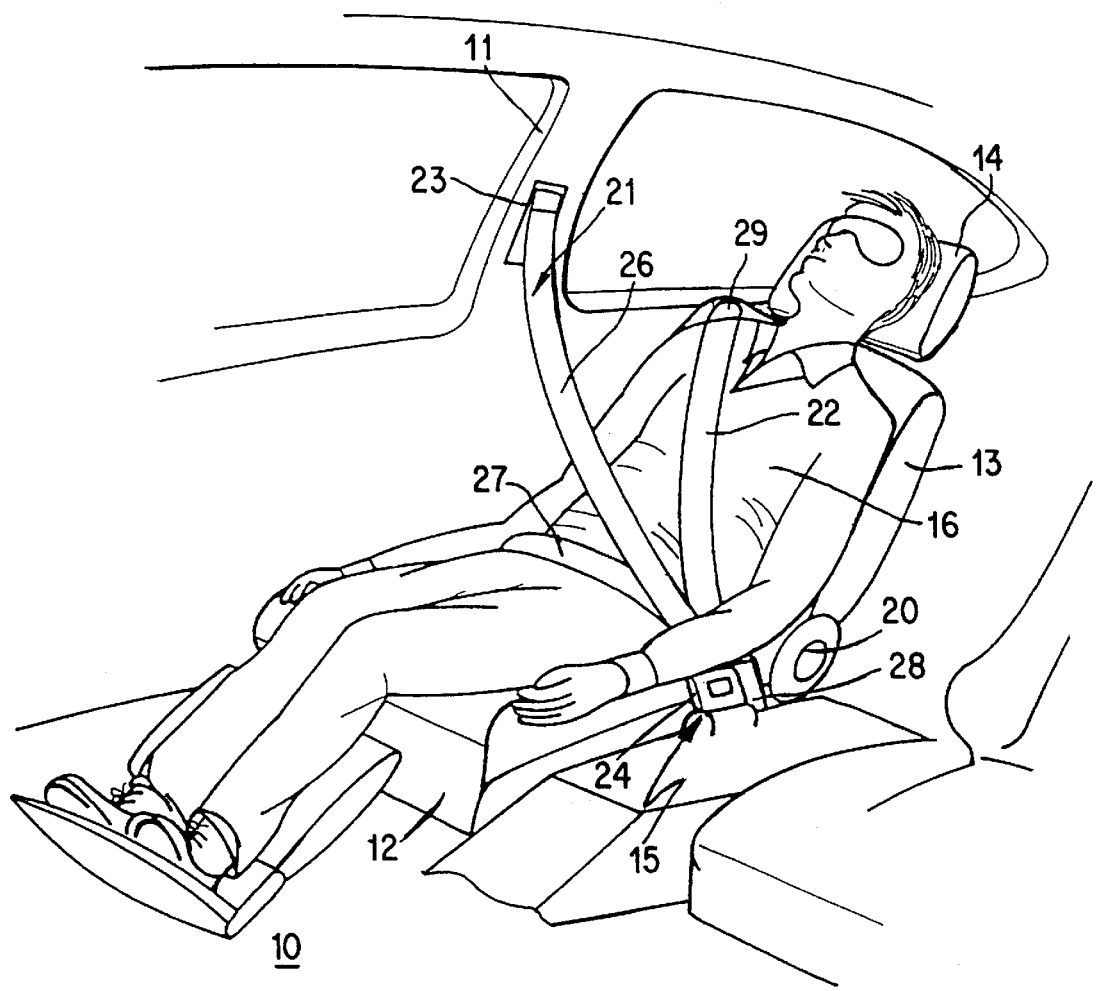
FIG. 2 sectionally illustrates the interior of a vehicle with a seating arrangement and a seat user, belted on the front passenger seat in the resting position, in a perspective view.

In FIG. 2, for the easy illustration of the resting position of a seat user 16, the interior of a passenger car is shown sectionally in perspective with seats for a driver and front seat passenger, the seat for the front seat passenger offering the seat user 16 the above-described resting position with protection against the danger of injury in the case of a crash. Compared to the above-described vehicle seat of FIG. 1, the seat for the front seat passenger is modified only with respect to the restraining device 15 and here, in turn, only with respect to the arrangement of the additional belt 22. The additional belt 22 is fastened here with its belt end once again to the upper edge of the backrest 13 in a belt retractor 29, which is fastened there, and can be inserted with its other belt end by means of a buckle tab in the second belt buckle 28. However, the belt retractor 29 is fastened to the upper edge of the backrest facing the B column, and the belt buckle 28 is disposed in the area of the floor on the seat side away from the B column 11, where the belt buckle 24 of the three-point safety belt 21 is also located. Likewise, as in the case of the vehicle seat of FIG. 1, the additional belt 22, put on in the resting position, extends as a transverse shoulder belt starting from the upper edge of the backrest, over the chest of the seat user 16, to the belt buckle 28, which is disposed at the floor, but now, however, from the right part of the upper edge of the backrest to the left side of the seat, as seen in the driving direction. In other respects, the construction and mode of functioning of the front passenger seat with the restraining device 15 in FIG. 2 is identical with the vehicle seat of FIG. 1, so that identical components have been provided with identical reference numbers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle seat and restraining system of a vehicle having a floor and side wall, comprising:

a seat cushion adapted to be adjustably fixable to the floor;
   a backrest adjustable with respect to the seat cushion;
   a restraining device for a seat user, said restraining device including: (i) a three-point safety belt including a shoulder belt extending in a seated position of the seat user over a chest of the seat user from a first belt fixing point disposable above an upper edge of the backrest at the sidewall of the vehicle to a detachable belt buckle forming a second belt fixing point fastenable in a floor area on a side of the vehicle seat away from the side wall, and a pelvis belt extending over a pelvis of the seat user from the detachable belt buckle to a third belt fixing point disposable in the floor area on a side of the vehicle seat facing the side wall; and (ii) an additional belt usable in a swiveled position of the backrest which is intended as a resting position for the seat user, said additional belt being tightenable over a chest of the seat user to a second belt buckle;
   wherein in the resting position of the seat user, a fixed adjustment of the seat cushion and backrest is provided such that the backrest is swiveled through an obtuse angle relative to the seat cushion and the seat cushion is shifted into a front, predetermined position such that the seat cushion is inclined toward a rear of the vehicle; and
   further wherein the additional belt extends as a transverse shoulder belt from an upper edge of the backrest to the second belt buckle which is disposable close to the floor of the vehicle.

2. A vehicle seat according to claim 1, wherein the additional belt is fastened to the upper edge of the backrest on the side of the vehicle seat facing the side wall of the vehicle, and the second belt buckle is disposed on the side of the vehicle seat away from the side wall of the vehicle.

3. The vehicle seat according to claim 2, wherein the backrest includes a frame, and further comprising a belt retractor fastened to the frame of the backrest, said additional belt being accommodated at one end in the upper edge of the backrest in the belt retractor.

4. The vehicle seat according to claim 3, wherein the frame of the backrest is reinforced to absorb potential forces acting on the additional belt.

5. The vehicle seat according to claim 1, wherein the backrest includes a frame, and further comprising a belt retractor fastened to the frame of the backrest, said additional belt being accommodated at one end in the upper edge of the backrest in the belt retractor.

6. The vehicle seat according to claim 5, wherein the frame of the backrest is reinforced to absorb potential forces acting on the additional belt.

7. The vehicle seat according to claim 6, wherein an automatic coupling between the additional belt and the three-point safety belt is provided such that the additional belt cannot be pulled out of the belt retractor until the belt buckle of the three-point safety belt is closed.

8. The vehicle seat according to claim 5, wherein an automatic coupling between the additional belt and the three-point safety belt is provided such that the additional belt cannot be pulled out of the belt retractor until the belt buckle of the three-point safety belt is closed.

9. The vehicle seat according to claim 1, further comprising a memory device, wherein an adjustment of the seat cushion and the backrest in the resting position is stored in the memory device and, upon recall from the memory device, the seat cushion and the backrest are automatically adjusted into the resting position.

10. The vehicle seat according to claim 9, further comprising servo motors operatively coupled to the seat cushion and the backrest, said servo motors performing the automatic adjustment of the seat cushion and the backrest.

11. The vehicle seat according to claim 9, further comprising a manually operating function key automatically recalling the resting position for adjusting the seat cushion and the backrest.

12. The vehicle seat according to claim 9, further comprising a microswitch disposed in the second belt buckle, wherein the resting position of the seat cushion and backrest is initiated upon closing the second belt buckle by inserting a locking tab on the additional belt.

13. The vehicle seat according to claim 1, further comprising a lower leg support disposed at the seat cushion, said lower leg support lying within a contour of the seat cushion in a seated position and being automatically shifted in the resting position into a thigh-supporting position.

14. The vehicle seat according to claim 13, wherein the lower leg support further comprises a longitudinal support which is shiftable longitudinally in guides in the seat cushion, and a padded support pivotally disposed on an end of the longitudinal support.

15. An occupant safety system, comprising:
a vehicle having a floor and a side wall;
a vehicle seat comprising a seat cushion adjustably fixed to the floor and a backrest adjustable with respect to the seat cushion;
a seat cushion adjustably fixed to the floor;
a backrest adjustable with respect to the seat cushion;
a restraining device for a seat user, said restraining device including: (i) a three-point safety belt including a shoulder belt extending in a seated position of the seat user over a chest of the seat user from a first belt fixing point disposed above an upper edge of the backrest at the sidewall of the vehicle to a detachable belt buckle forming a second belt fixing point fastened in a floor area on a side of the vehicle seat away from the side wall, and a pelvis belt extending over a pelvis of the seat user from the detachable belt buckle to a third belt fixing point disposed in the floor area on a side of the vehicle seat facing the side wall; and (ii) an additional belt usable in a swiveled position of the backrest which is intended as a resting position for the seat user, said additional belt being tightenable over a chest of the seat user to a second belt buckle;
wherein in the resting position of the seat user, a fixed adjustment of the seat cushion and backrest is provided such that the backrest is swiveled through an obtuse angle relative to the seat cushion and the seat cushion is shifted into a front, predetermined position such that the seat cushion is inclined toward a rear of the vehicle; and
further wherein the additional belt extends as a transverse shoulder belt from an upper edge of the backrest to the second belt buckle which is disposed close to the floor of the vehicle.

16. The safety system according to claim 15, wherein the additional belt is fastened to the upper edge of the backrest on the side of the vehicle seat facing the side wall of the vehicle, and the second belt buckle is disposed on the side of the vehicle seat away from the side wall of the vehicle.

17. The safety system according to claim 15, wherein the backrest includes a frame, and further comprising a belt retractor fastened to the frame of the backrest, said additional belt being accommodated at one end in the upper edge of the backrest in the belt retractor.

18. The safety system according to claim 17, wherein the frame of the backrest is reinforced to absorb potential forces acting on the additional belt.

19. The safety system according to claim 18, wherein an automatic coupling between the additional belt and the three-point safety belt is provided such that the additional belt cannot be pulled out of the belt retractor until the belt buckle of the three-point safety belt is closed.

20. The safety system according to claim 15, further comprising a memory device, wherein an adjustment of the seat cushion and the backrest in the resting position is stored in the memory device and, upon recall from the memory device, the seat cushion and the backrest are automatically adjusted into the resting position.

* * * * *